March 23, 1948. W. A. MORTON ET AL 2,438,448
APPARATUS FOR CONTINUOUSLY DRAWING ELONGATED PRODUCTS
Filed March 4, 1943 8 Sheets-Sheet 1

INVENTORS
William A. Morton and
Theodore H. Sloan
by their attorneys
Stebbins and Blenko March 23, 1948.   W. A. MORTON ET AL   2,438,448
APPARATUS FOR CONTINUOUSLY DRAWING ELONGATED PRODUCTS
Filed March 4, 1943   8 Sheets-Sheet 2

INVENTORS
William A. Morton and
Theodore H. Sloan
by their attorneys
Stebbins and Blenko

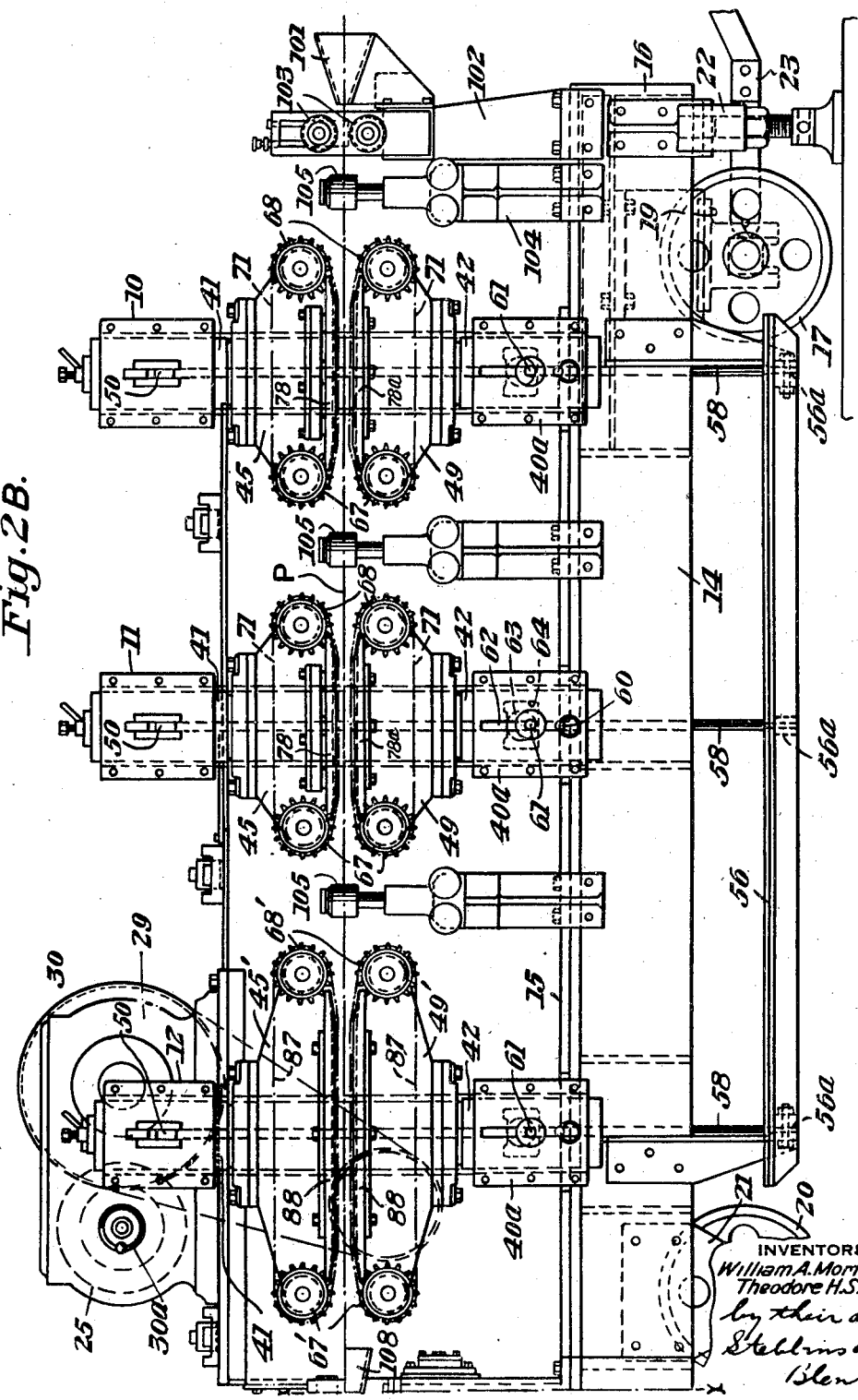

INVENTORS
William A. Morton and
Theodore H. Sloan
by their attorneys
Stebbins and Blenko

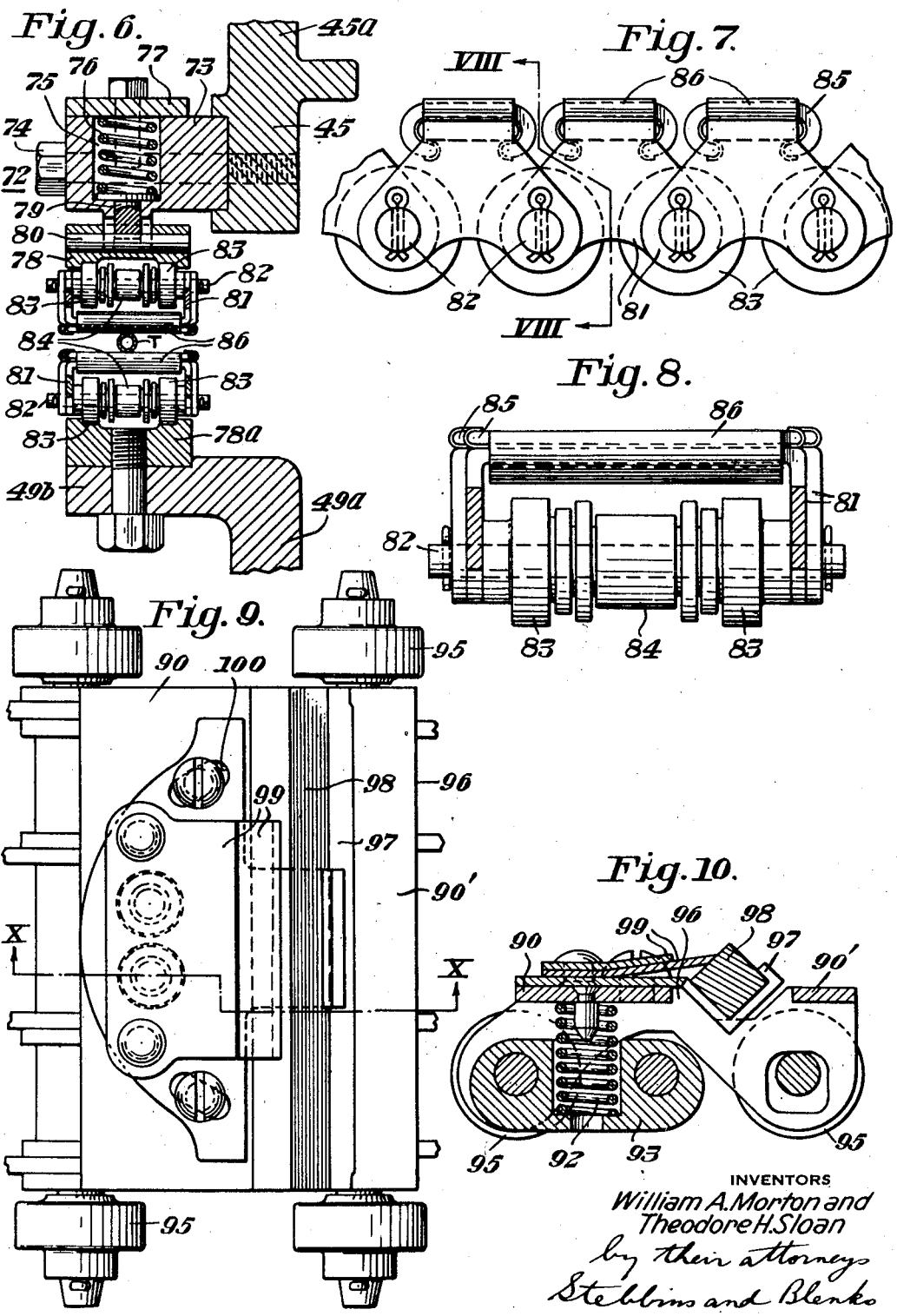

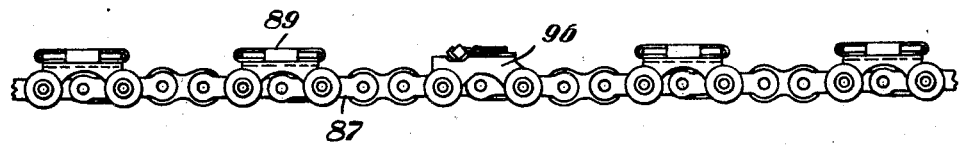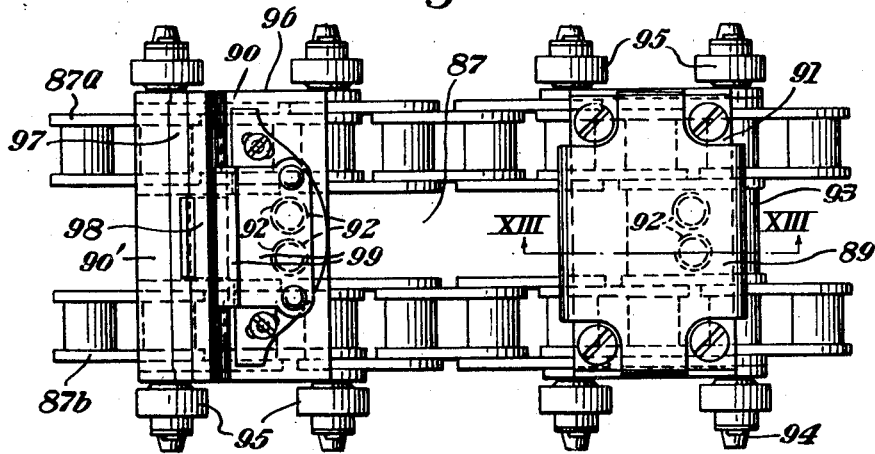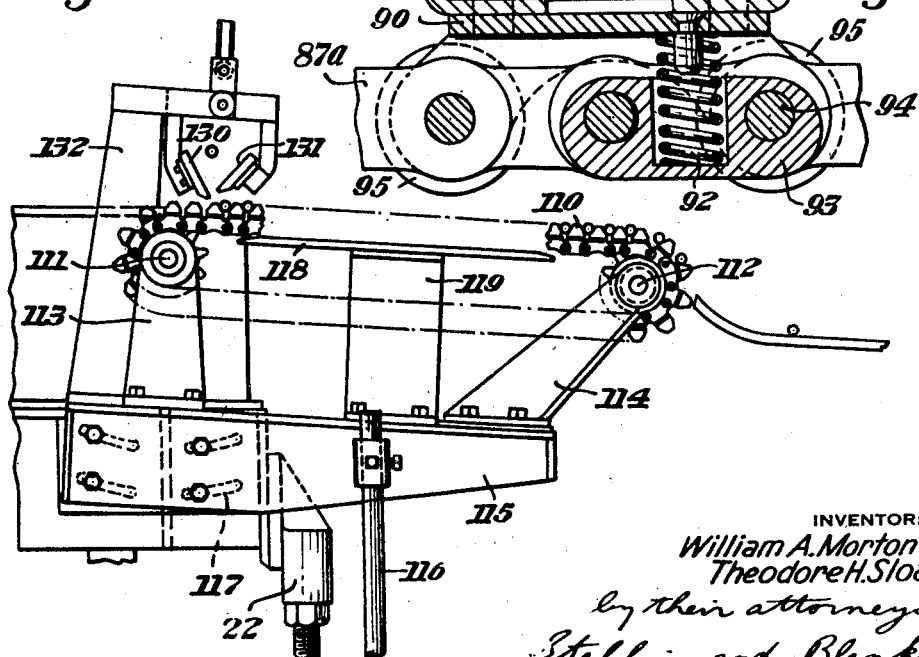

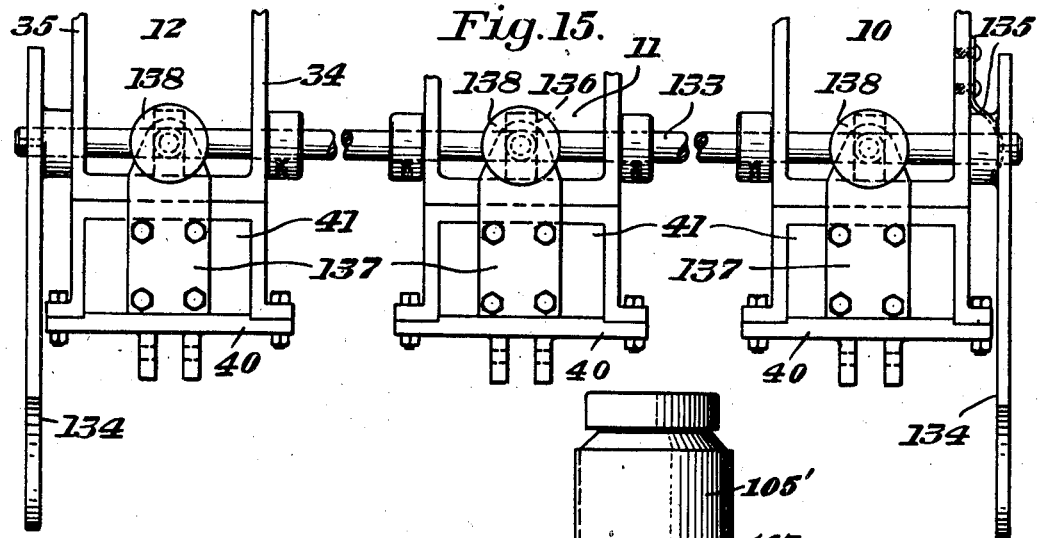
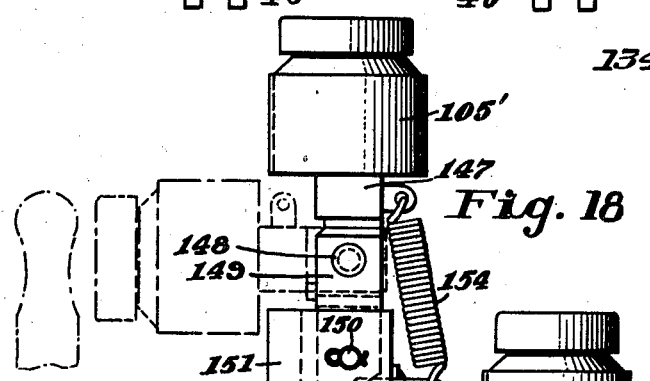
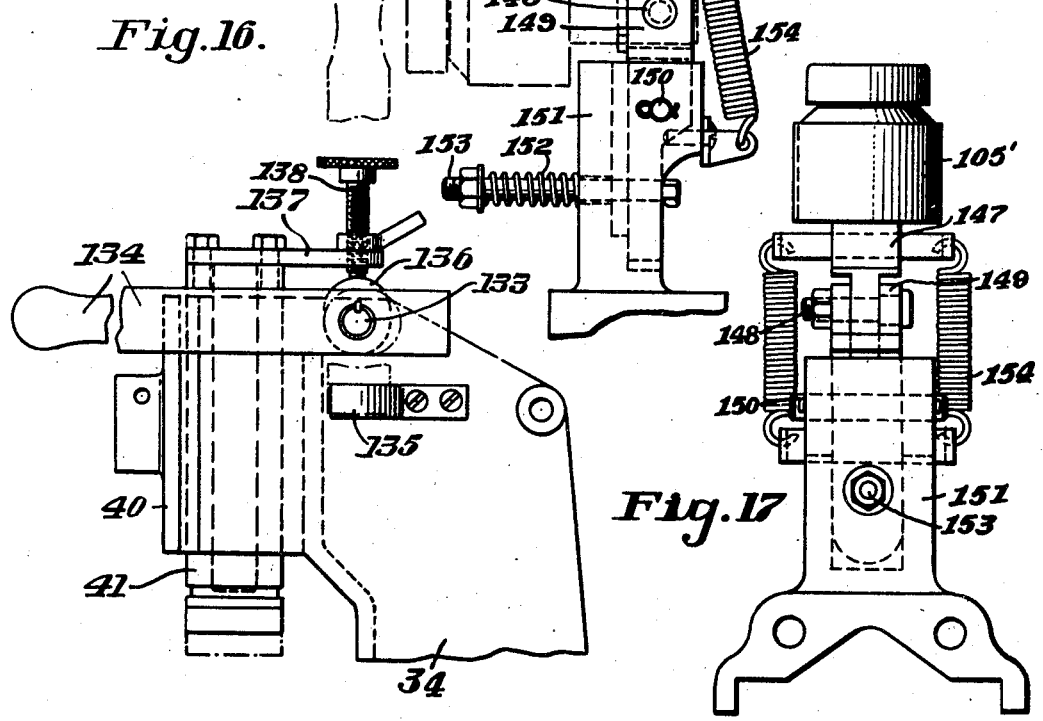

Patented Mar. 23, 1948

2,438,448

UNITED STATES PATENT OFFICE 2,438,448

APPARATUS FOR CONTINUOUSLY DRAWING ELONGATED PRODUCTS

William A. Morton and Theodore H. Sloan, Pittsburgh, Pa., assignors to G. M. S. Corporation, Pittsburgh, Pa., a corporation of Pennsylvania Application March 4, 1943, Serial No. 477,982

8 Claims. (Cl. 49—17.1)

This invention relates to the manufacture of elongated products and, in particular to an apparatus for continuously drawing an indefinite length of product from an appropriate forming apparatus, and finally severing it into proper lengths. The invention is especially intended for, and will be hereinafter described in reference to, the manufacture of glass tubing although it may be employed for handling other products of the same general character, with appropriate modifications.

Glass tubing is now generally manufactured by drawing molten glass from a rotating mandrel in a continuous strand which is rotated and cools as it travels away from the mandrel and finally sets. One example of apparatus for forming glass tubing is shown in Danner Patent No. 1,218,598. This invention concerns the apparatus for receiving the tubing from the forming apparatus, supporting and conveying it longitudinally, and then severing it into lengths. While apparatus has been known heretofore for performing these operations, such as that disclosed in Danner Patent No. 1,220,201, such apparatus has been characterized by numerous objectionable features and it is the general object of this invention to improve upon the conveying and severing apparatus previously known.

In a preferred embodiment of the invention, we provide a plurality of tractor stands, each including a pair of traveling means such as conveying chains, adapted to grip the product frictionally and move it along a predetermined path. The conveying chains are positioned to engage the product on opposite sides and are skewed relative to each other whereby the chains of each tractor stand tend to rotate the product about its axis as well as move it longitudinally. Guide-rolls are mounted adjacent the stands for confining the product to its predetermined path. We provide means for adjusting the amount of skew between the chains of each tractor stand in order to vary the rotational force applied to the tube. We also provide means for adjusting the pressure with which the conveying chains engage the product. One chain of each stand, furthermore, is relatively fixed during normal operations while the other is mounted for immediate retraction in order to release the product instantaneously when this becomes desirable. The retractable chains are floatingly supported.

The previously known means for severing a continuously drawn product such as glass tubing have been capable of cutting to only one length which is predetermined by the design of the machine. Other lengths have required hand cutting with the loss incident thereto resulting from the necessity of scrapping the short ends of pieces of standard length. We provide improved severing mechanism of this general type, by equipping the last tractor stand with scoring means. Our invention also includes means for severing the product which can be set to cut any desired length over a relatively wide range. We can thus deliver the product in various required lengths, within close tolerances. Our variable-length severing means comprises a scorer operating intermittently and controlled by release mechanism driven through a variable-speed drive from the main drive for the tractor units.

Further novel features and advantages of our invention will become apparent during the following detailed description and explanation thereof, referring to the accompanying drawings for an illustration of a preferred embodiment and certain modifications. In the drawings, Figures 1A and 1B together constitute a plan view of our apparatus for drawing tubing and one form of severing means including a conveyor for carrying away the severed lengths of tubing;

Figures 2A and 2B together constitute a side elevation of the apparatus shown in Figures 1A and 1B, with the conveying chains of the tractor units in the same vertical plane, instead of in skewed relation;

Figure 6 is a sectional view taken along the plane of line VI—VI of Figure 4, showing a portion of Figure 3 to enlarged scale, i. e., the conveying chains, their guide tracks and the supports of the latter;

Figure 7 is a partial side elevation of one of the conveying chains;

Figure 8 is a transverse section through the chain taken along the plane of line VIII—VIII of Figure 7;

Figure 9 is a plan view to enlarged scale showing a scorer unit forming part of one chain of the tractor and scoring stand;

Figure 10 is a transverse section therethrough along the plane of line X—X of Figure 9;

Figure 11 is a partial side elevation of one chain of the tractor and scoring stand;

Figure 12 is a partial plan view to enlarged scale;

Figure 13 is a section through one gripping unit of the chain of Figures 11 and 12 taken along the plane of line XIII—XIII of Figure 12;

Figure 14 is an end elevation of the apparatus shown in Figure 1A such as would be viewed by looking on the latter from the left;

Figure 15 is a diagrammatic plan view showing alternate means for adjusting the upper chains of the several tractor stands simultaneously within a small range;

Figure 16 is an end elevation such as would be viewed by looking on the apparatus of Figure 15 from the right;

Figure 17 is a side elevation of a modified form of one of a pair of guide-rolls employed to confine the product laterally;

Figure 18 is a side elevation of the apparatus shown in Figure 17 taken at an angle of 90° from the latter.

Figure 1A:
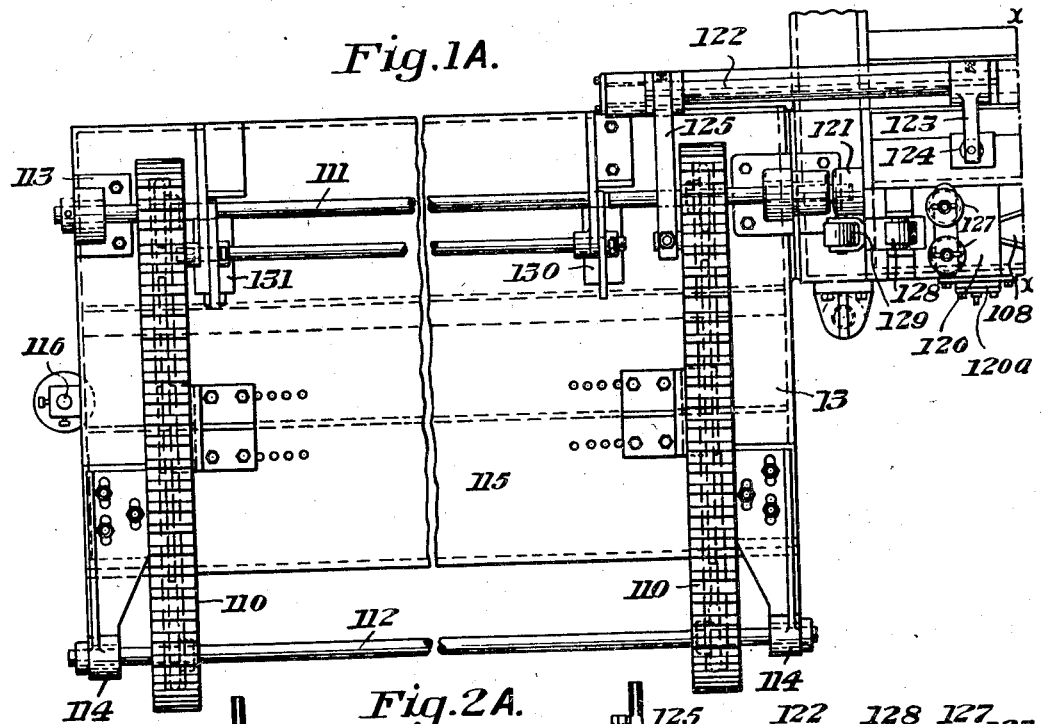
Figure 2A:
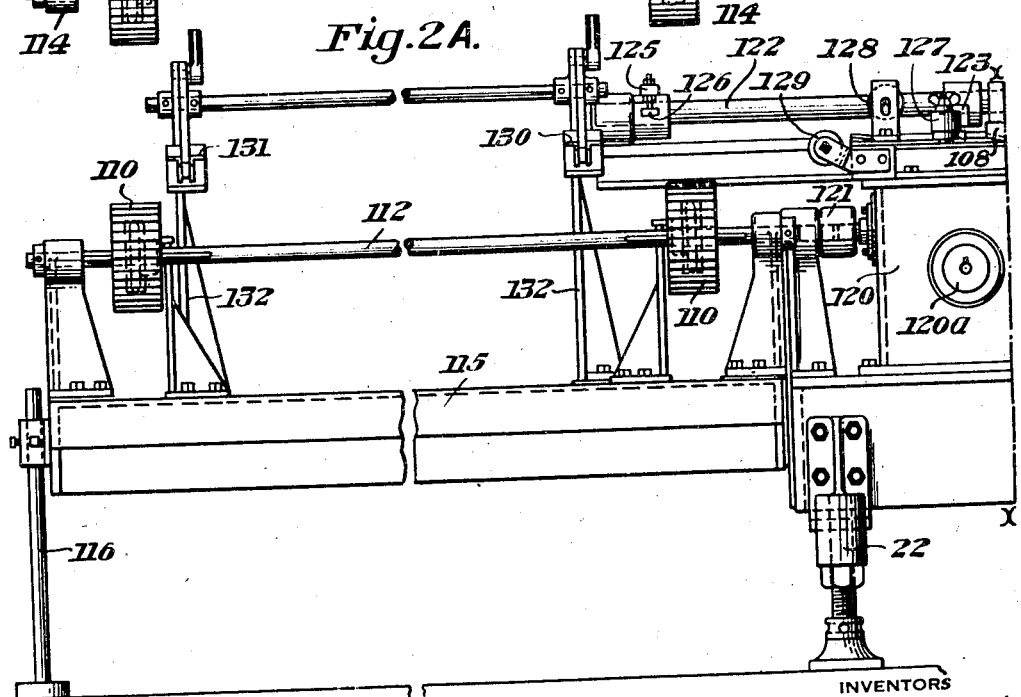

Referring now in detail to the drawings and, for the present, to Figures 1A, 1B, 2A, 2B and 3, our apparatus comprises generally a first tractor stand 10, a second tractor stand 11, a tractor and scoring stand 12 and a carry-away conveyor 13. For convenience in moving the apparatus of our invention from one tube-forming apparatus to another, it is largely mounted on a truck 14 comprising a platform 15 with depending side flanges 16 and 16a. The truck has front wheels 17 journaled on an axle 18 mounted on a fifth wheel 19. Rear wheels 20 are journaled in brackets 21 secured to the side flanges. Jacks 22 are secured to the flanges 16 adjacent the ends of the platform. By operating the jacks, the truck platform may be raised so that the wheels 17 and 20 are off the floor, thus supporting the apparatus in fixed position. When it is desired to move the apparatus, the jacks may again be operated to lower the wheels onto the floor whereupon the truck may be conveniently moved by means of a tongue 23 pivoted to the front axle.

Figure 1B:
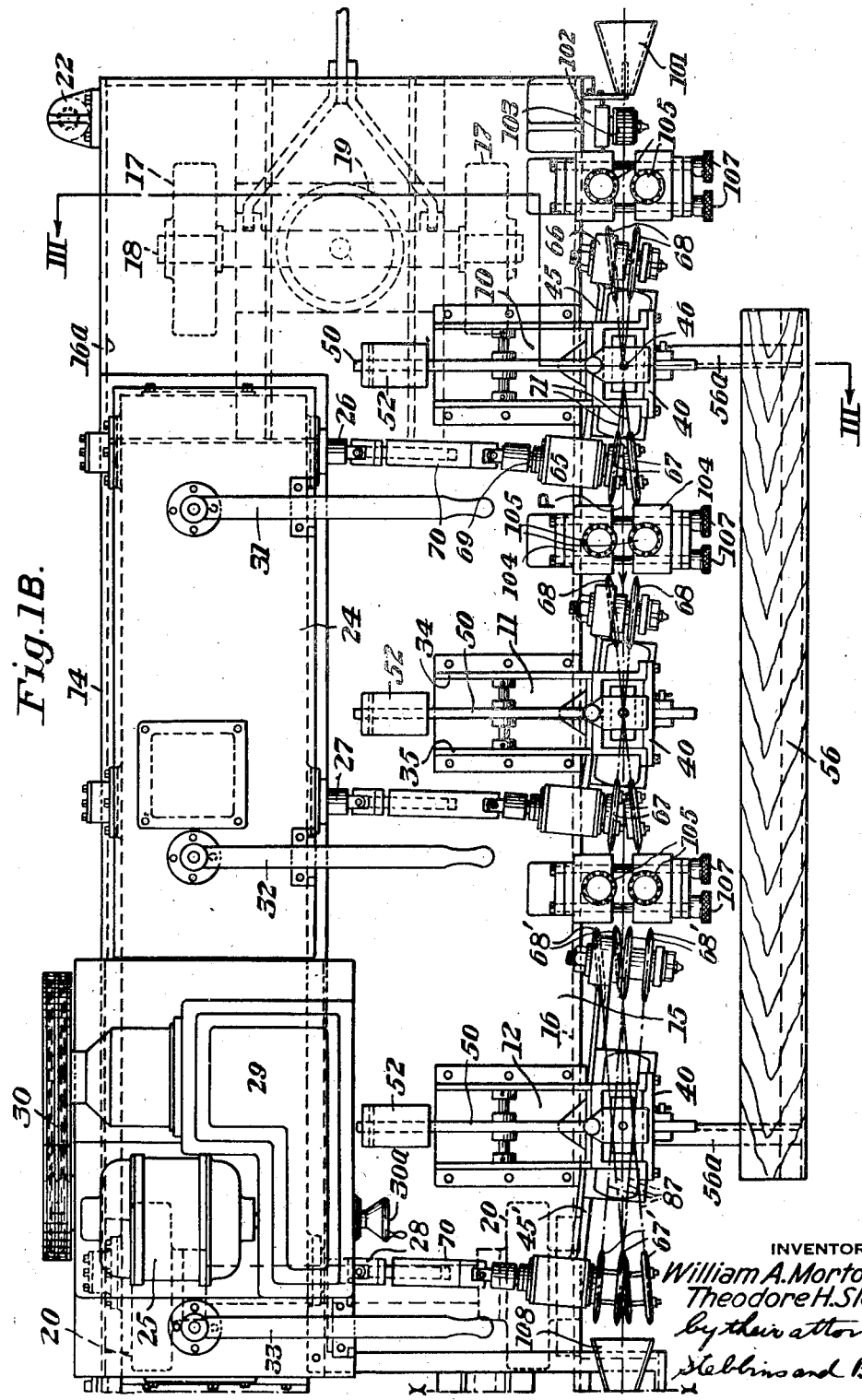

As shown in Figure 1B, the stands 10, 11 and 12 are positioned on one side of the truck. On the other side is positioned a drive housing 24. A motor 25 on the housing drives pairs of upper and lower spindles 26, 26a, 27, 27a, 28 and 28a projecting therefrom toward the tractor stands, through a variable-speed drive 29, a belt-drive 30 and internal gears, chain drives, etc. (not shown), the details of which may vary widely and need not be described in detail. It is sufficient to state that by virtue of the drive mechanism supported on and contained in the housing 24, the spindles 26, 26a, 27, 27a, 28 and 28a are all driven at the same speed. The speed of all the spindles may be varied simultaneously by turning the adjusting wheel 30a on the variable-speed drive 29. The drive for each of the spindles includes a clutch (not shown) for disconnecting it from the drive mechanism. Hand levers for operating the clutches are mounted on top of the housing 24 at 31, 32 and 33.

The tractor stands 10 and 11 are identical and the tractor and scoring stand 12 differs but slightly therefrom so that a detailed description of one, stand 10, will suffice to make clear their structure. Each stand comprises a pair of spaced plates 34 and 35 secured to the platform 15 normal thereto and to the depending flanges thereof. The plates 34 and 35 overhang the edge of the platform 15 adjacent their upper and lower ends and form upper and lower guide boxes 37 and 38 by the addition of cross-walls 39 and 39a and cover-plates 40 and 40a. Guide-blocks 41 and 42 are slidable in the boxes 37 and 38.

Figure 5:
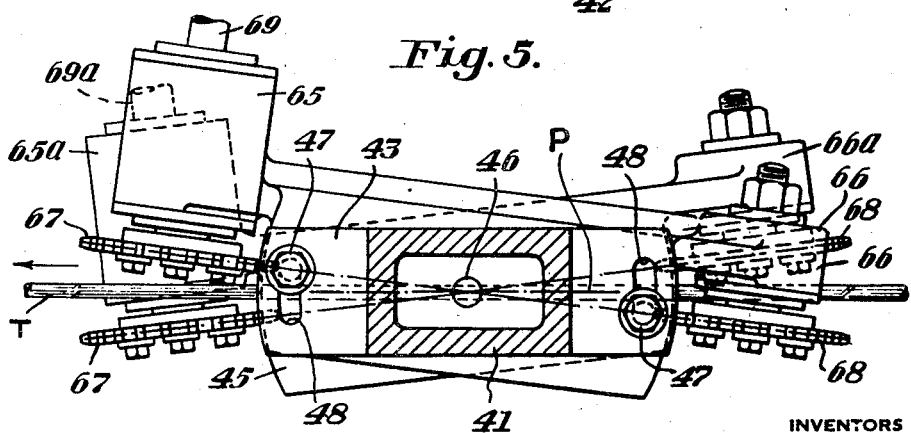
Figure 5 is a view partly in section along the plane of line V—V of Figure 4, showing the conveying chains in the skewed relation which they actually occupy in normal operation.

The block 41 has a bottom plate 43 and the block 42 a top plate 44. A bracket 45 swivels on the plate 43 about a central pin 46 and is held in an angularly adjusted position by screws 47 threaded into the bracket and passing through arcuate slots 48 adjacent the ends of the plate 43. A bracket 49 is similarly mounted on the top plate 44 of the block 42. By virtue of the swiveling movement of the brackets on the plates 43 and 44, the brackets may be adjusted to various angles of skew relative to the line of travel P of the product T, as shown in Figure 5. The brackets 45 and 49 constitute supports for traveling chains adapted to engage the product and move it longitudinally. The construction and operation thereof will be further described shortly.

The weight of block 41 and the parts carried thereby is partly counterbalanced by a lever 50 pivoted on a pin 51 passing through the plates 34 and 35. The lever is provided with a counterweight 52 adjustable therealong, the weight having a through-pin engageable with notches formed in the upper edge of the lever. The end of the lever 50 opposite that on which the weight 52 is positioned, projects through suitable openings in the cross-wall 39 and cover-plate 40 and through the guide-block 41. A roller 53 journaled in the block bears on the upper edge of the lever. The block 41 has a top-plate 54 and an adjustable stop-screw 55 which limits downward movement of the block. A removable pin 41a passing through holes in ears on the cover-plate 40 holds the block 41 in the illustrated position when tubing is not being drawn.

The blocks 41 of the several stands may be simultaneously raised or retracted by a treadle 56 including arms 56a pivoted on brackets 57 secured to the flange 16 of the truck platform. Push-rods 58 passing through guides 59 and engaging the lower edges of the levers 50 are pivoted to the arms 56a.

The block 42 is normally held in the illustrated position by a pin 60 removably inserted through holes in the cover-plate 40a and the adjacent wall of the block. When the pin 60 is removed, the block 42 may be retracted by a cam-shaft 61 journaled in the cover-plate 40a. The shaft has an operating handle 62 at its outer end and a cam 63 at its inner end working in an opening 64 formed in the wall of the block 42 adjacent the cover-plate 40a.

Figure 4:
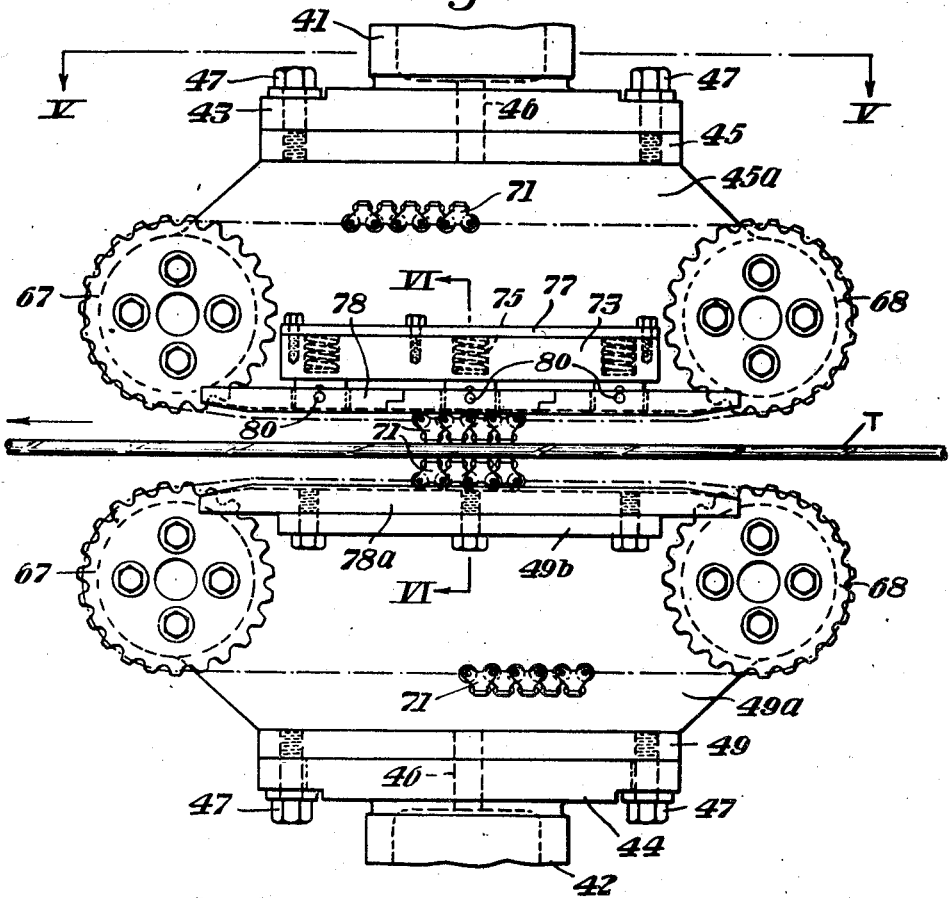
Figure 4 is a side elevation of a portion of Figure 2B, showing the conveying chains of one tractor unit on an enlarged scale.

Referring now more particularly to Figures 4, 5 and 6, the bracket 45 has a vertical flange 45a provided with spaced bearing boxes 65 and 66. Shafts journaled in these boxes are provided with sprockets 67 and 68. The shaft in box 65, designated 69, is coupled to the upper driving spindle 26 by coupling 70 including universal joints and a telescoping shaft.

A chain 71 is trained around the sprockets 67 and 68. A guide-track 72 is provided for the lower run of the chain. It comprises a bar 73 secured to the bracket 45 by screws 74 and having holes 75 spaced therealong to receive compression-springs 76. A cover-plate 77 confines the springs in the hole. A track-rail 78 is secured to plungers 79 in the holes 75, on which the springs 76 bear, by pins 80. As clearly shown in Figure 6, the chain 71 rides on the rail 78 and the springs 76 permit slight vertical movement of the rail.

The bracket 49 has a vertical flange 49a and a horizontal flange 49b and is provided with bearing-boxes 65a and 66a similar to those of bracket 45 designated 65 and 66. Sprockets 67 and 68 are mounted on shafts journaled in these boxes and the shaft in the box 65a, designated 69a, is coupled to the lower driving spindle 26a by a coupling 70a similar to that shown at 70. A chain 71 is trained around the sprockets of the bracket 49, the upper run of the chain traveling along a rail 78a secured to the horizontal flange 49b of the bracket 49.

The chains 71, as shown in Figures 6 through 8 are composed of links 81 connected by pins 82. Rollers 83 journaled on the pins engage the rails 78 and 78a. A central roller 84 on the pins 82 is adapted to be engaged by the teeth of the sprockets. The links 81 are of U-shape, as shown in Figure 8, and are provided with friction pads 85 having their ends bent around the links and secured thereto by sheet metal holders 86. These holders have two opposite edges bent around the connecting portion of the links and all four edges bent around the ends of the friction pads.

The stands 10, 11 and 12, as described above, are identical except that the stand 12 has dual sprockets 67' and 68' and chains 87 differing slightly from the chains 71. The shafts 69 and 69a of stand 11 are driven by spindles 27 and 27a. The sprockets 67' and 68' are mounted on brackets 45' and 49' generally similar to those shown at 45 and 49 but differing slightly therefrom. Both the brackets 45' and 49' are provided with fixed track-rails 88 similar to the track-rails 78a of bracket 49. The chains 87, as shown in Figures 9 through 13, are each composed of a pair of strands of roller links 87a and 87b. Friction pads 89 are mounted on the links, bridging the strands at intervals. The construction of these pads is clearly shown in Figure 13. A bridge member 90 extends between the strands 87a and 87b and the friction pad 89 is secured thereon by a clamping plate 91. The members 90 are yieldably mounted on the chain, being held in normal position by a compression spring 92 carried in a block 93. Shafts 94 extending through the block 93 and the rollers of the strands 87a and 87b, are provided with rollers 95 engaging the rails 88.

Each of the chains 87 has a scoring unit 96. The scoring unit is generally similar to the mounting for the friction pad 89 except that the bridge member 90' is provided with a cutter-holder 97 adapted to receive a cutter-bar 98 of the hardest tool steel. The bar 98 is held in the holder by leaf springs 99. The holder may be angularly adjusted on the bridge member 90' by virtue of arcuate slots 100 through which pass the screws securing the holder in position thereon.

The remainder of the apparatus will be described in detail during the following explanation of the passage of elongated product from a forming apparatus through our drawing and severing apparatus.

When the product such as a glass tubing, has been started from the forming apparatus, it is inserted through a tapered guide 101 mounted on a bracket 102 carried on the platform 15. The bracket 102 also supports a stand of horizontal guide-rolls 103 between which the product is passed. Brackets 104 ahead of each of the tractor stands 10, 11 and 12 support pairs of vertical guide-rolls 105 which confine the product laterally and, with the traveling chains of the tractor stands, keep it from departing from a predetermined path of travel, i. e., the chain line designated P. As best shown in Figure 1B, one of the rolls 105 of each pair is adjustable toward and from the other by screws 107.

Figure 3:
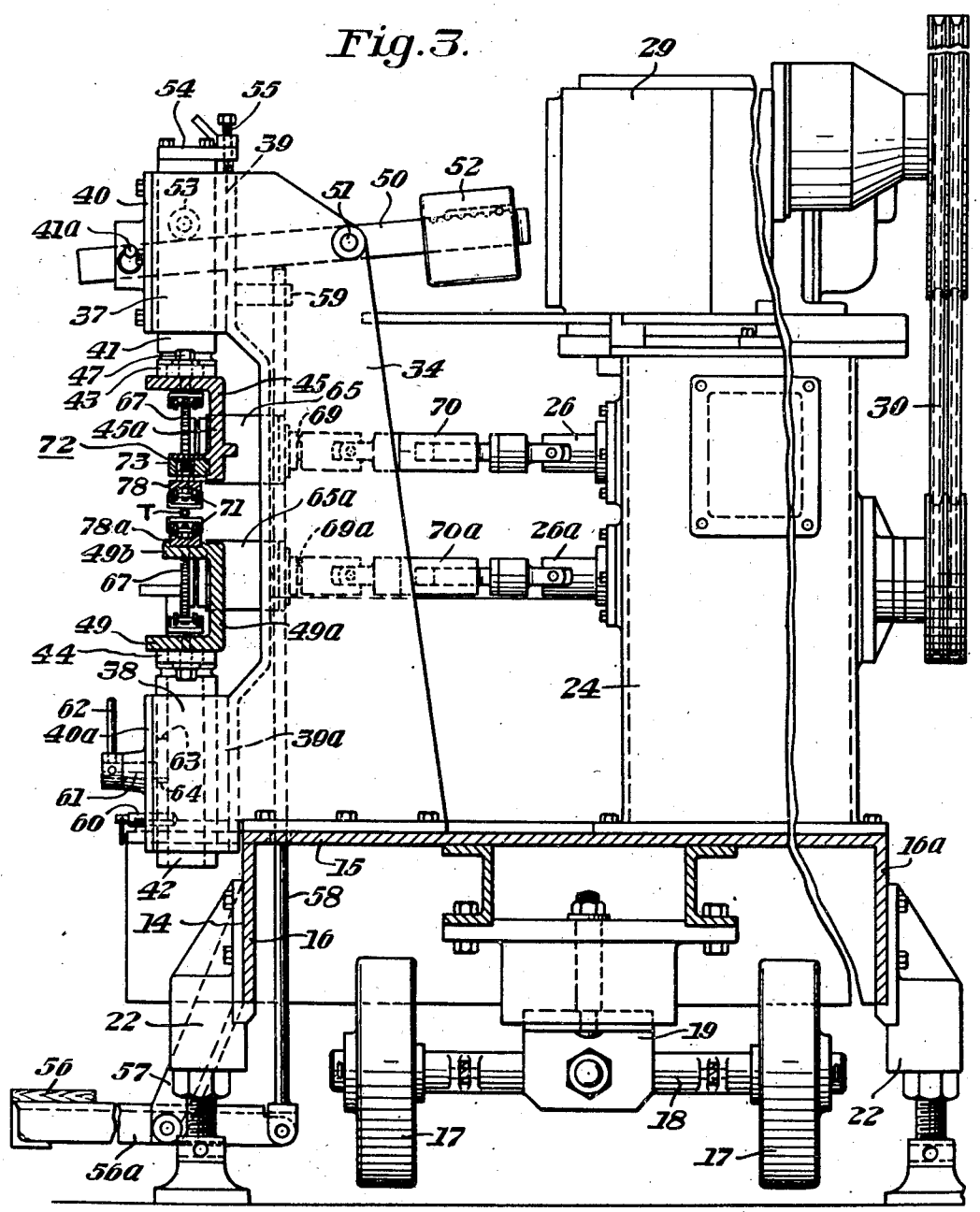
Figure 3 is a transverse section taken along the plane of line III—III of Figure 1B.

To facilitate starting of the product through the machine, the treadle 56 is depressed sufficiently to raise the brackets 45 and 45' to the necessary extent. After the product has been properly started, the treadle is released and the upper brackets are lowered until their chains engage the product as shown in Figure 3. The pressure of the chains on the product is determined by the position of the counterweights 52. Screws 55 are adjusted to limit downward movement of the upper brackets in accordance with the size of the tube being drawn. When the treadle has been released, the product will be pulled longitudinally by the chains, passing successively through the throat 101, the horizontal rolls 103, the first stand of vertical rolls 105, the traveling chains of stand 10, the second stand of vertical rolls 105, the chains of stand 11, the third stand of vertical rolls 105, the chains 87 of stand 12 and thence to a second tapering guide 108.

Since the spindles 26, 27 and 28 are all driven at the same speed, the chains 71 and 87 travel at the same linear speed, the pair of chains of each stand serving to draw the product along the path P. In addition, the skewed relation of the upper and lower chains of each stand produces a rotational force turning the product about its axis. The extent of this turning force is determined by the angle of skew between the upper and lower chains of each stand. By varying this angle, the speed of rotation of the portion of the tube in the grip of the chains may be synchronized with the rotation of the portion of the product which is still plastic, i. e., the portion between the forming mechanism and the entering guide 101.

Since the upper chain brackets are floatingly supported, being partly counterbalanced, they are free to rise and fall as may be necessary to accommodate variations in the diameter of the product. The upper chains of the stands 10 and 11 have the added resilience provided by the springs which permit the track-rails 78 to rise slightly under pressure.

The chains 87 are so disposed on their sprockets that the scoring units 96 of the two chains will engage the product simultaneously on opposite sides. It will be apparent that as the chains 87 travel around their sprockets, the cutter bars 98 of the scoring units repeatedly engage the product at points spaced therealong by the length of the chains. Because of the angle of skew between the brackets 45' and 49', the cutter-bars 98 move in opposite directions transversely of the product with their edges in engagement therewith, as it moves longitudinally along its path. The cutter-holders 97 may be adjusted to the proper angle so that the score made on the product by the cutters will lie in a plane normal to the axis of the product instead of describing a helix on the exterior thereof.

It will be apparent that the product as delivered from the guide 108 is scored to the desired length and is therefore ready to be severed. To this end, appropriate break-off mechanism is incorporated in the carry-away conveyor 13. This conveyor comprises a pair of chains 110 trained around sprockets mounted on spaced shafts 111 and 112. The shafts are journaled in brackets 113 and 114 carried on a base 115. The base 115 has one end disposed adjacent the end of the truck platform 15 and secured thereto. The other end of the base is supported on a post 116. The bolts securing the base 115 to the end of the truck platform pass through arcuate slots 117 in the base, thus permitting angular adjustment of the latter relative to the platform. Tracks 118 for supporting the upper runs of the chains 110 are mounted on standards 119 secured to the base 115. The shaft 111 is driven from a speed-reducer 120 on the platform 15 through a coupling 121. The reducer 120 has a shaft 120a driven from the main drive in the housing 24.

A rock-shaft 122 is journaled in bearings mounted on the reducer 120 and on the base 115 respectively. The shaft is actuated by a rocker-arm 123 engaged by a plunger 124. This plunger is raised and lowered by a cam (not shown) on shaft 120a of the reducer 120. An arm 125 extending from the shaft 122 over the path of the tubing emerging from the guide 108 has a hammer 126 adapted to strike the overhanging end of the tubing and break it at the score formed by the cutter-bars 98. On emerging from the guide 108, the product passes between vertical guide-rolls 127, under a hold-down roll 128 and over a supporting roll 129, all of which are mounted on the reducer 120. The operation of the rock-shaft 122 is so timed that the hammer arm 125 will strike the overhanging end of the tubing at the instant when the score is over the supporting roll 129.

As the end of the product passes beyond the roll 129, it enters between sloping guide-plates 130 and 131 supported above the chains 110 on brackets 132 secured to the base 115. As the fall of the hammer 126 fractures the tubing at the score, the length thus severed falls and is directed by the plates 130 and 131 onto the chains 110. The links of the latter are designed to provide notches adapted to receive successive lengths of tubing as shown in Figure 14.

Figures 15 and 16 illustrate a further provision for controlling the position of the guide-blocks 41, in order to effect small vertical adjustments thereof. As shown in the drawings, a cam shaft 133 is journaled in the spaced plates forming the stands 10, 11 and 12 and is provided with operating levers 134 at each end. A spring 135 serves frictionally to hold the levers in erect position when shifted thereto. The shaft 133 has cams 136 positioned thereon between the side plates of the several stands. The guide-blocks 41 are provided with top-plates 137 which replace those shown at 54. Adjustable stop screws 138 threaded through the overhanging ends of the top-plates 137 engage the cams 136. By this arrangement, rotation of the shaft 133 will effect vertical adjustment of the blocks 41 and the chain-supporting brackets 45 and 45'. It will be apparent that the structure just described will permit a fine adjustment of the tractor chains vertically. The retracting means for the chains operated by the treadle 56, of course, is not intended for making fine adjustments but simply for raising the chains entirely out of operating position.

Figures 17 and 18 show a modified construction of the vertical guide-roll adapted to be substituted for one of the rolls of each pair 105. In the modified construction, one roll 105' is journaled on a vertical shaft 147. The shaft 147 is pivoted at 148 to a post 149. The post 149 is pivoted to a bracket 151 by pin 150 and is yieldably held in vertical position by a compression spring 152 on a bolt 153 extending through alined holes in the bracket 151 and the lower end of the post. This permits slight lateral movement of roll 105'. Tension springs 154 extend between ears on the shaft 147 and on the bracket 151. These springs serve normally to hold the shaft 147 in erect position but permit it to be tilted to the horizontal position as shown in chain lines in Figure 18. In that position, the springs 154 lie beyond the dead center so the roll tends to remain in horizontal position until manually restored to vertical. It will be apparent that this provision considerably facilitates the starting of the product along its path through the conveying and severing apparatus. Preferably the modified-roll 105' is substituted for the outer roll of each of the pairs 105.

It will be apparent that the apparatus of our invention is characterized by numerous advantages over previously known apparatus for drawing and severing a continuous product. The provision of dual tractor elements, viz., the two stands 10 and 11, insures continuous service during the drawing operation and avoids delays incident to the adjustment of the apparatus for different sizes of tubing and speeds of operation. This results in a substantial increase in production per man-hour.

The floating mounting of the upper tractor chains provides a regulable pressure on the product. The release treadle permits the traction to be stopped almost instantaneously, in case of need. This is important in starting the tubing through the apparatus.

The angular adjustability of the chain-supporting brackets permits control of the rotational force exerted on the tubing, independently of the speed at which the product is moved along its path. The quality of the product is thus improved particularly in that it has a more nearly constant circular section as a result of the synchronism between the rotation of the part of the product in the apparatus and the part issuing from the forming apparatus which is still plastic.

The scoring means serves to score the product effectively at predetermined intervals so it may be easily fractured by the breaking hammer, into the desired lengths. The angular adjustability of the chains of the scoring stands permits the length of the score circumferentially of the tubing to be various in accordance with the diameter of the latter.

The common drive for all moving elements assures proper synchronism and speed equality therebetween. The universal joints in the couplings between the driving spindles and the driven sprockets permit vertical adjustment of the chain-supporting brackets without disconnecting the drive.

The friction pads on the tractor chains insure a good grip on the product and lessen the danger of breakage thereof. The chains of the scoring stand have friction pads similar to those of the tractor stands so that if necessary, the scoring stand may be relied on to effect the desired traction and rotation of the product as well as the scoring thereof.

The cam shaft 133 permits the upper chain-supporting brackets of the tractor and scoring stands to be raised quickly through a short distance. This is advantageous during the starting of the product through the apparatus, in permitting sudden variations in size to be accommodated, thus assuring continuous traction without applying enough force to break portions of the product having excessive diameter and still maintaining a grip upon portions of small diameter. At the same time, the descent of the tractor chains is arrested by the stop screws while the product is not being drawn. The treadle-operated lift for the tractor chains permits them to be retracted for the initial feeding of the product therebetween immediate frictional gripping thereby.

The tiltable mounting for one guide roll of each pair permits it to be dropped to horizontal position, thereby eliminating interference and providing easy access to the tubing during the starting thereof. The initial feeding of the tubing into the apparatus is readily accomplished by shifting the tiltable guide roll of each pair to horizontal position and holding the upper tractor chains above the expected plane of contact with the top of the tubing. This is done by one operator while the tubing is manually brought alongside by a second operator to start it through the apparatus.

Although we have illustrated and described but a preferred embodiment with certain modifications, it will be clear that changes in the construction and arrangement of various parts may be made without departing from the spirit of the invention or the scope of the appended claims.

We claim:

1. A tractor stand for longitudinally advancing an elongated product such as a tube or the like along a predetermined path of travel, comprising a column having vertically spaced alined guide means on one side thereof, blocks movable vertically in said guide means, brackets secured, respectively, to the lower end of the upper block and the upper end of the lower block, sprockets journaled on said brackets, tracks extending between the sprockets and chains so disposed on the sprockets and tracks of the brackets, respectively, as to engage the top and bottom of the product traveling therebetween.

2. A tractor stand for longitudinally advancing an elongated product such as a tube or the like along a predetermined path of travel, comprising a column having vertically spaced alined guide means on one side thereof, blocks movable vertically in said guide means, brackets secured, respectively, to the lower end of the upper block and the upper end of the lower block, sprockets and chains so mounted on said brackets, respectively, that the chains engage the top and bottom of the product traveling therebetween, a manually operable lift for raising the lower block from a retracted position to operating position, and means floatingly suspending the upper block.

3. A tractor stand for longitudinally advancing an elongated product such as a tube or the like along a predetermined path of travel, comprising a column having vertically spaced alined guide means on one side thereof, blocks movable vertically in said guide means, brackets secured, respectively, to the lower end of the upper block and the upper end of the lower block, sprockets and chains so mounted on said brackets, respectively, that the chains engage the top and bottom of the product traveling therebetween, and means floatingly suspending the upper block.

4. A tractor stand for longitudinally advancing an elongated product such as a tube or the like along a predetermined path of travel, comprising a column having vertically spaced alined guide means on one side thereof, blocks movable vertically in said guide means, brackets secured, respectively, to the lower end of the upper block and the upper end of the lower block, sprockets and chains so mounted on said brackets, respectively, that the chains engage the top and bottom of the product traveling therebetween, a lever pivoted on said column engaging said upper block adjacent one end, and a counterweight adjustable along the other end of the lever.

5. Apparatus for continuously drawing an elongated product such as a tube or the like comprising a plurality of tractor stands spaced along the line of travel of the product, each stand including traveling chains having means adapted to engage the product frictionally at the top and bottom thereof and advance it along said line, a supporting column, vertically spaced guides on said column, blocks reciprocable vertically in said guides, brackets having tracks and sprockets for said chains secured to said blocks, and a pivotal connection between each of said brackets and the block to which it is secured whereby te brackets may be skewed in a horizontal plane.

6. A tractor stand for longitudinally advancing an elongated product such as a tube or the like along a predetermined substantially horizontal path of travel, comprising a pair of traveling chains having friction surfaces adapted to engage the product on the top and bottom thereof, a supporting column, horizontally disposed brackets above and below said path having chain-driving and guiding means thereon, means securing the lower bracket in fixed position on said column, vertical guide means on the column, a block slidable in said guide means, the upper bracket being mounted on said block for vertical movement, and means counterbalancing a portion of the weight of the upper bracket and the parts associated therewith.

7. A tractor stand for longitudinally advancing an elongated product, such as a tube or the like, along a predetermined path of travel, comprising upper and lower tractor elements adapted to engage the product frictionally, a support for each element, means floatingly suspending the support for the upper element, the support for the lower element being vertically reciprocable, and means including a lever cooperating with said last-mentioned support and operable to move the lower tractor element out of the normal position in which it makes contact with the product, to facilitate starting the product through the stand.

8. A tractor stand as defined by claim 7 characterized by a cam shaft to which said lever is secured, and a cam on said shaft engaging said vertically reciprocable support.

WILLIAM A. MORTON.
THEODORE H. SLOAN.

REFERENCES CITED

The following references are of record in the file of this patent:

UNITED STATES PATENTS

| Number | Name | Date |
|---|---|---|
| 786,565 | Hughes | Apr. 4, 1905 |
| 876,267 | Colburn | Jan. 7, 1908 |
| 1,136,362 | Pease | Apr. 20, 1915 |
| 1,220,201 | Danner | Mar. 27, 1917 |
| 1,578,098 | Schrader | Mar. 23, 1926 |
| 1,580,809 | Brown | Apr. 13, 1926 |
| 1,595,103 | Kingsley | Aug. 10, 1926 |
| 1,660,323 | Brown | Feb. 28, 1928 |

(Other references on following page)

| Number | Name | Date |
|---|---|---|
| 1,743,960 | Favre | Jan. 14, 1930 |
| 1,776,556 | Gray et al. | Sept. 23, 1930 |
| 1,876,031 | Soubier | Sept. 6, 1932 |
| 1,887,414 | Le Roy | Nov. 8, 1932 |
| 1,951,993 | Pond | Mar. 20, 1934 |
| 2,009,326 | Sanchez-Vello | July 23, 1935 |
| 2,009,793 | Sanchez-Vello | July 30, 1935 |
| 2,085,904 | Freese | July 6, 1937 |
| 2,091,494 | Snyder | Aug. 31, 1937 |
| 2,120,853 | Brown et al. | June 14, 1938 |
| 2,155,131 | Hanlein | Apr. 18, 1939 |
| 2,157,067 | Brown et al. | May 2, 1939 |
| 2,234,302 | Dichter | Mar. 11, 1941 |
| 2,243,937 | Almond | June 3, 1941 |
| 2,290,837 | Stuckert | July 21, 1942 |
| 2,303,587 | Snyder | Dec. 1, 1942 |

FOREIGN PATENTS

| Number | Country | Date |
|---|---|---|
| 480,621 | Germany | Aug. 5, 1929 |
| 540,414 | Germany | Dec. 17, 1931 |
| 543,172 | Great Britain | Feb. 12, 1942 |
| 774,191 | France | Sept. 17, 1934 |